United States Patent [19]

Shultz

[11] Patent Number: 4,951,373

[45] Date of Patent: Aug. 28, 1990

[54] VALVE SPRING COMPRESSION TOOL

[76] Inventor: William E. Shultz, 239 N. Main St., Lombard, Ill. 60148

[21] Appl. No.: 314,110

[22] Filed: Feb. 23, 1989

[51] Int. Cl.[5] .............................................. B23P 19/04

[52] U.S. Cl. ....................................................... 29/217

[58] Field of Search ................. 29/217, 218, 227, 261, 29/262; 81/125; 254/10.5

[56] References Cited

U.S. PATENT DOCUMENTS

| | | | |
|---|---|---|---|
| 1,000,559 | 8/1911 | Sjoholm | 29/217 |
| 1,854,116 | 4/1932 | Schebeko | 81/125 |
| 2,604,170 | 7/1952 | Leffler | 81/125 |
| 3,487,528 | 1/1970 | Shultz | 29/218 |
| 4,663,998 | 5/1987 | Parsons et al. | 81/125 |

FOREIGN PATENT DOCUMENTS

| | | | |
|---|---|---|---|
| 608191 | 4/1926 | France | 81/125 |

*Primary Examiner*—Robert C. Watson

*Attorney, Agent, or Firm*—Marshall, O'Toole, Gerstein, Murray & Bicknell

[57] ABSTRACT

A valve spring compressing tool including a pair of gripping leg members operatively connected to straddle a valve spring, on opposed sides. The leg members each include a gripping means disposed on a lower portion thereof for gripping an undersurface of a coil spring, and a compression member for compressing the coil spring on opposite sides thereof at points above the grippping means. The compression member is operatively interconnected to an elongated post extending to an upper portion of the tool such that rotation of the post in opposite directions will cause the compression member to move toward and away from the gripping means to compress the coil spring or allow the coil spring to expand. The elongated post includes a plurality of flattened surfaces on an upper portion thereof adapted to receive a removable handle having an internal bore adapted to be securely and removably connected through a radially extending upper portion of the elongated post.

18 Claims, 3 Drawing Sheets

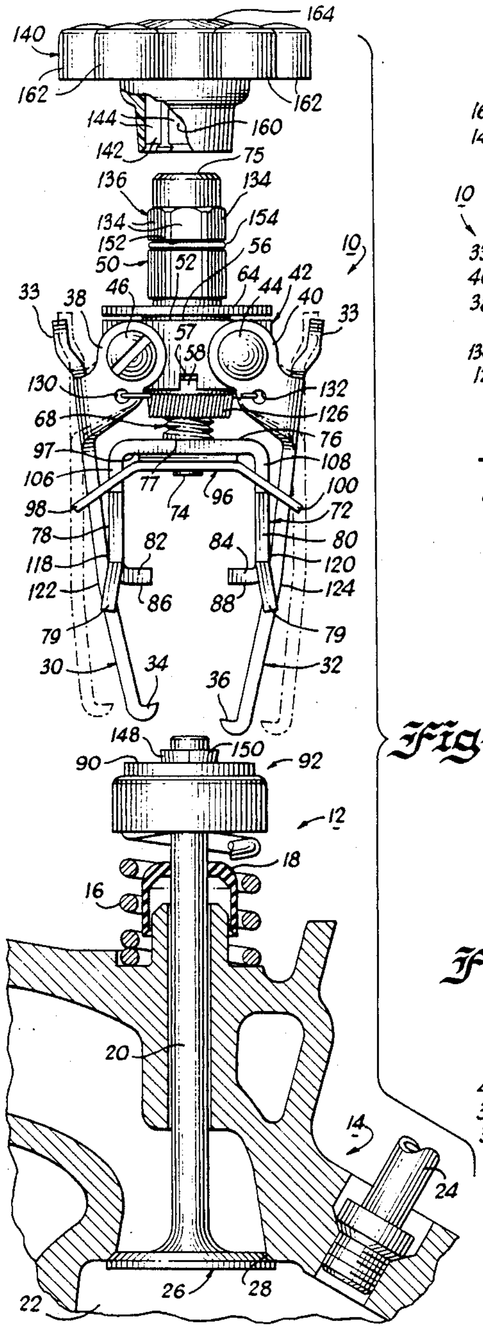
Fig-1
Fig-2
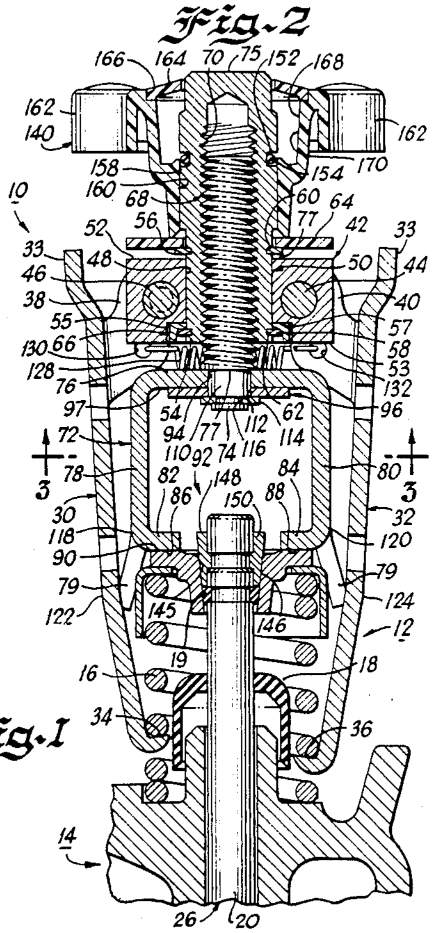
Fig-3
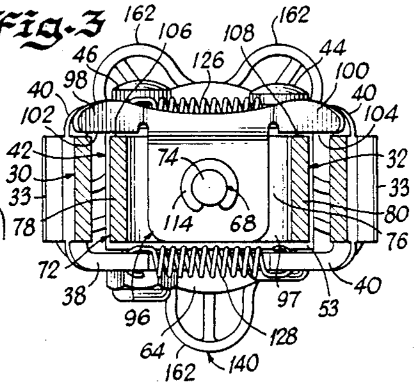

VALVE SPRING COMPRESSION TOOL

FIELD OF THE INVENTION

The present invention is directed to a valve spring compression tool for compressing springs in overhead valve assemblies of internal combustion engines. More particularly, the present invention is directed to a valve spring compressing tool capable of being used by hand by turning a knob on the upper end of the tool or, alternatively, capable of being used by removing the knob and attaching a wrench or other tool to an upper rotatable post that remains in the same vertical position during spring compression and releasing so that the tool is easily used in the confines that the valve spring is located within an internal combustion engine.

BACKGROUND OF THE INVENTION AND PRIOR ART

Each valve of an internal combustion engine includes a valve stem that reciprocates upwardly and downwardly to open and close a cylinder by ignition of gasoline within the cylinder thereby allowing for the escape of combustion gases, as exhaust gas, from each cylinder, and providing mechanical energy for movement of a vehicle. Each internal combustion engine valve includes a rubber seal disposed around an upper portion of the valve stem to prevent engine oil from leaking into the engine cylinders. It is not uncommon for these rubber seals to deteriorate with age and/or other engine malfunctions so that the seals need replacement during the life of the internal combustion engine. The construction of common internal combustion engines is such that a valve spring is disposed to surround each of these valve seals, and the valve spring is held in position by a valve spring retainer assembly held in position by a pair of valve keeper halves. In order to remove the valve seals, an upper portion of the valve spring must be compressed downwardly to allow the valve spring retainer assembly to move downwardly thereby freeing the valve keeper halves for removal. After removal of the valve keeper halves, the valve spring and valve spring retainer assembly are removed easily and the valve seals can be manually pulled off of the valve stem and replaced. The valve spring and valve spring retainer assembly then are repositioned, while the valve spring remains compressed; the valve keeper halves then are repositioned and the valve spring and valve spring retainer assembly are allowed to expand upwardly to their original positions held in place by the valve keeper halves.

Various tools have been used for the purpose of compressing valve springs of an internal combustion engine for the purpose of removing valve seals, valve retainer assemblies and/or valve keeper halves. Examples of suitable tools for this purpose are found in this inventor's prior U.S. Pat. Nos. 3,487,528 and Des. 222,331. One of the problems associated with this inventor's prior valve spring compressing tools is that it is sometimes very difficult to compress the valve springs by hand, and that the tool must be manipulated in a very small workspace. The tool of the present invention obviates the difficulties associated with prior valve spring compression tools and satisfies a long felt need in the art.

SUMMARY OF THE INVENTION

In brief, a valve spring compressing tool includes a pair of gripping leg members operatively connected to straddle a valve spring, on opposed sides. The leg members each include a gripping means disposed on a lower portion thereof for gripping an undersurface of a coil spring, and a compression member for compressing the coil spring on opposite sides thereof at points above the gripping means. The compression member is operatively interconnected to an elongated post extending to an upper portion of the tool such that rotation of the post in opposite directions will cause the compression member to move toward and away from the gripping means to compress the coil spring or allow the coil spring to expand. The elongated post includes a plurality of flattened surfaces on an upper portion thereof adapted to receive a removable handle having an internal bore adapted to be securely and removably connected through a radially extending upper portion of the elongated post.

Accordingly, an object of the present invention is to provide a new and improved tool capable of gripping a coil spring at spaced coils, on opposed sides thereof, for uniformly compressing the coil spring to a predetermined and controlled degree and maintaining the spring compressed as long as desired during removal and replacement of a coil spring disposed in apparatus, such as a valve spring of an internal combustion engine.

Another object of the present invention is to provide a new and improved valve spring compression tool including a new and improved control end capable of manual hand control through a removable handle or capable of manual control by removing the handle and attaching a wrench or other additional tool thereto for gaining mechanical advantage or better manipulation within small confines of a workspace.

The above and other objects and advantages of the present invention will become apparent from the following detailed description of the present invention taken in conjunction with the drawings.

BRIEF DESCRIPTION OF THE DRAWINGS

FIG. 1 is a partially broken away, elevational, side view of the apparatus of the present invention disposed above a valve of an internal combustion engine;

FIG. 2 is an enlarged view similar to FIG. 1 showing the apparatus of FIG. 1 in operative working disposition on the valve spring of FIG. 1;

FIG. 3 is a cross-sectional view of the apparatus of FIG. 1 taken along the line 3—3 of FIG. 2 showing the tool during an early stage of compressing an internal combustion valve spring;

DETAILED DESCRIPTION OF THE PREFERRED EMBODIMENT

Figure 4:
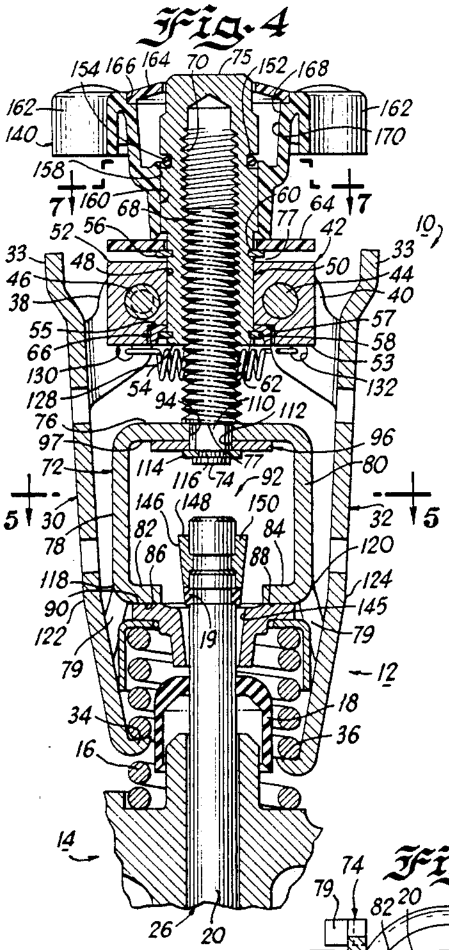
FIG. 4 is a view similar to FIG. 3 showing the apparatus of the present invention after completely compressing the valve spring such that the valve spring can be disassembled.

Turning now to the drawings and initially to FIG. 1, there is shown a new and improved valve spring compression tool generally designated by reference numeral 10. As shown n FIG. 1, the tool 10 is designed to straddle a valve, generally designated 12, of an internal combustion engine generally designated 14, in order to compress a valve spring 16 for replacement of a rubber seal 18 that, when functioning properly fits, like seal 19, tightly around a valve stem 20 and prevents engine oil from leaking through the rubber seal 18 and into the engine cylinder 22.

In order to start the rubber seal removal process, each valve stem 20 must be in its uppermost position, as shown in FIG. 1. The valve is raised to the closed or uppermost position, as shown in FIG. 1 by removing the cylinder spark plug (not shown) and attaching a compressed air hose 24 in the spark plug position. The compressed air will seat the valve 26 against a valve seat 28 and raise the valve stem 20 to its uppermost position, as shown in FIG. 1. With the valve 26 in its closed and uppermost position, as shown in FIG. 1, the coil spring 16 is in an expanded or extended condition, as shown in FIG. 1, so that the valve spring compressing tool 10 can be secured to the coil spring 16 in order to compress the coil spring 16 for removal of the rubber seal 18, as will be described in more detail hereinafter.

The valve spring compression tool 10 of the present invention generally includes a pair of pivotable leg members, generally designated 30 or 30A and 32. Outwardly inclined knurled ear members 33 integral with upper ends of the leg members 30 and 32 allow for manual spreading of the leg members 30 and 32 for initially positioning of the leg members about the coil spring 16. Each leg member 30 and 32 has a lowermost end having an integral claw member 34 and 36, respectively, integral with the leg members 30 and 32 and cocked upwardly and inwardly toward the valve stem 20 and adapted for being secured to the coil spring 16 on opposed sides of the valve stem 20, as best shown in FIG. 2. The leg members 30 and 32 also each contain integral extending ear portions 38 and 40 for pivotally securing the leg members 30 and 32 to a block member, generally designated 42, through a pin or bolt 44 or 46 attached by nut 47.

The block member 42 is a metal block that defines a central vertical aperture 48 that receives an internally threaded post 5. The post 50 is smaller in external diameter than the diameter of the aperture 48 in the block member 42 so that the vertical post 50 is freely rotatable within the aperture 48 in the block member 42.

In assembling the tool 10, the post 50 is inserted into the block 42 from an upper surface 52 of block 42 and a lower end 54 of the post 50 extends downwardly from an undersurface 53 of block 42 so that C-shaped retaining clips 56 and 58 can be disposed within grooves 60 and 62 on post 50 for maintaining the vertical position of post 50 within the aperture groove 48 of the block 42 while allowing the post 50 free rotation within the aperture 48. A suitable washer 64 can be disposed can the upper surface 52 of block 42 for conveying information or instructions to the user of the tool 10.

An annular groove 55 forming an annular bearing surface wall 57 is machined into the lower surface 53 of block 42, for receiving a tapered collar 66 suitably dimensioned to fit around the lower end 54 of post 50 above groove 62 so that after positioning the collar 66 around the lower end 54 of post 50, above groove 62, the C-shaped retaining ring 58 can be forced into groove 62 to prevent the post from being upwardly removed from block 42. The collar 66 includes an upper bearing surface 67 that bears against the bearing wall 57 during tool use; a lower bearing surface wall 69; and an upwardly and inwardly tapered annular side wall 71 that receives C-shaped retaining clip 58 and forces the clip 58 into the groove 62 in post 50. In this manner, the post 50 together with collar 66 and retaining clip 58 operate in unison in free rotation within the aperture 48 in block 42. The collar 66, preferably of a different or more hardened metal than the block 42, bears directly against the bearing wall 57 of block 42 and directly against an upper bearing wall 73 of the retaining clip 58 to prevent damage to the retaining clip 58 during tool use, while allowing an upper, planar end 75 of post 50 to be impacted with a hammer to drive the tool downwardly to break loose the valve spring retainer assembly 92. To achieve the full advantage of the present invention, a small space 77, about 1/64 inch to ¼ inch, e.g., about 1/32 inch, is left between a lower surface of retaining clip 56 and the upper surface 52 of block 42 so that hammer impact on uppermost post surface 75 drives the post 50 and shaft 68 downwardly a corresponding distance by forcing a bearing surface 77 at the lowermost end of shaft 68 against an upper surface of base portion 76 of compression member 72, thereby impacting feet members 82 and 84 against the valve spring retainer assembly 92 to loosen the retainer assembly 92.

An externally threaded shaft 68 is threaded into internal threads 70 within the post 50 so that rotation of post 50 causes this externally threaded shaft 68 to move upwardly or downwardly while maintaining the post 50 in the same vertical position with respect to the block 42. In a preferred embodiment, the internal threads 70 within the post 50 the external threads on shaft 68 are left handed so that clockwise rotation of post 50 causes the shaft 58 to move downwardly or away from the post 50. A coil spring compression member 72 is connected to a lowermost end 74 of the externally threaded shaft 68 and is basically U-shaped having an uppermost base portion 76 and integral downwardly extending leg portions 78 and 80 dimensioned such that the leg portions 78 and 80 can straddle the coil spring 16. The leg portions 78 and 80 each have an inwardly extending foot member 82 and 84, respectively, extending inwardly from each leg portion 78 and 80 substantially perpendicular to the longitudinal axis of the externally threaded shaft 68. Each foot member 82 and 84 includes an inwardly extending lowermost surface 86 and 88, respectively, adapted to seat against an uppermost surface 90 of a valve spring retainer assembly generally designated 92.

The coil spring compression member 72 is attached to the end 74 of the externally threaded shaft 68 by inserting the shaft 68 through a central aperture 94 extending completely through the base portion 76 of the coil spring compression member 72. To achieve the full advantage of the present invention, a shaft stabilizing member 96 also is attached to a lowermost end 76 of the externally threaded shaft 68 below a lower surface 97 of the base portion 76 of compression member 72 and has a pair of extending stop ears 98 and 100 having stop contact surfaces 102 and 104, respectively, adapted to make rotation-stopping contact against forward edges 106 and 108 on leg portions 78 and 80, respectively. Outwardly inclined stop ears 79 on the compression member 72 straddle the leg members 30 and 32 on each leg portion 78 and 80 to prevent the compression member 72 from rotation during movement of the externally threaded shaft 68. To prevent the externally threaded shaft 68 from rotating with respect to the internally threaded post 50 both the coil spring compression member 72 and the shaft stabilizing member 96 are secured to the externally threaded shaft 68 by being positioned over a flattened end portion 110 of the shaft 68 through aperture 94 on the compression member 72 and aperture 112 on the stabilizing member 96 and a C-shaped retaining clip 114 is secured within a groove 116 disposed below the flattened end 110 of the externally threaded shaft 68 to secure the compression member 72 and the stabilizing member 96 in position on the lowermost end 74 of the externally threaded shaft 68.

Figures 9, 10, 11, 12:
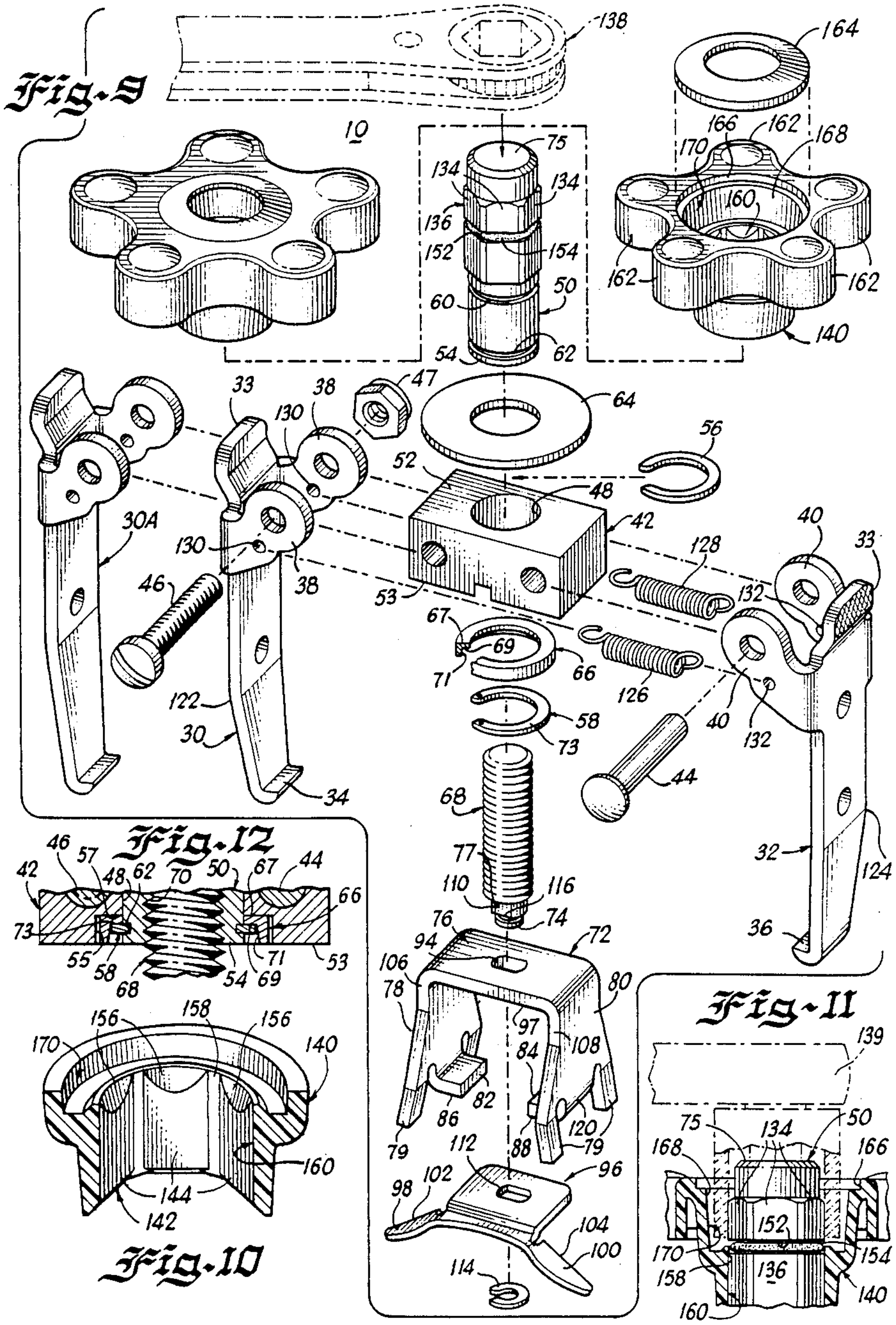
FIG. 9 is an exploded perspective view of the apparatus of the present invention also showing alternatively connectable legs connectable through a removable bolt.
FIG. 10 is a partially broken away elevational view of a handle portion of the apparatus of the present invention.
FIG. 11 is a partially broken away, partially elevational view of the apparatus of the present invention having a wrench attached to an upper post portion for rotation of the post and vertical movement of a compression member operatively interconnected thereto.
FIG. 12 is an enlarged portion of FIG. 2.

As best shown in FIGS. 2 and 9, the leg members 30 and 32 are spring biased inwardly so that the claw members 34 and 36 are normally spring biased inwardly to pivot about the pivot pins 46 and 44, respectively, so that the claw members 34 and 36 are normally forced inwardly within the coil spring 16, as shown in FIG. 2. The inward biasing of the leg members 30 and 32 is limited by outer surfaces 118 and 120 of the leg portions 78 and 80 of the U-shaped coil spring compression member 72. For this purpose, the leg members 30 and 32 are both bent inwardly from points 122 and 124 disposed beneath the foot member 82 and foot member 84 of the coil spring compression member 72 so that the claw members 34 and 36 are able to reach inwardly sufficiently to be disposed in gripping contact beneath a coil of the coil spring 16, as best shown in FIG. 2. The leg members 30 and 32 are spring biased inwardly by attaching the two leg members 30 and 32 together with a pair of coil springs 126 and 128 connected to the ears 38 and 40 of the leg members 30 and 32, respectively, at apertures 130 in ear members 38 and apertures 132 in ear members 40 disposed beneath the pivot pins 46 and 44, respectively.

Figure 6:
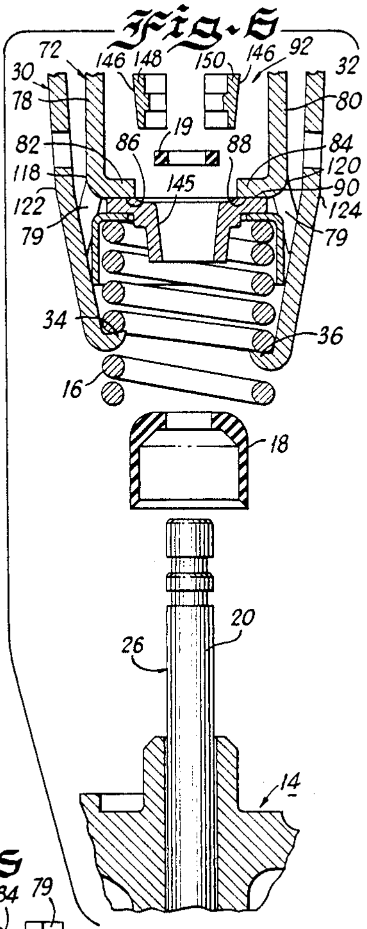
FIG. 6 is a partially broken away view of the apparatus of the present invention showing removal of the valve spring and valve seal.
Figure 5:
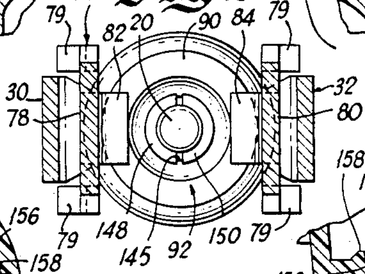
FIG. 5 is a cross-sectional view of the apparatus of the present invention taken along the line 5—5 of FIG. 4.
Figure 7:
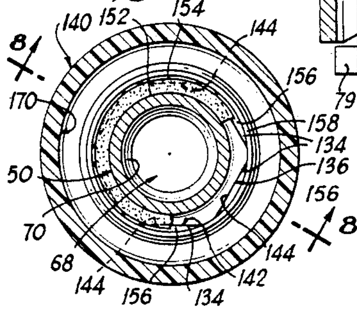
FIG. 7 is a cross-sectional view of the apparatus of the present invention taken along the line 7—7 of FIG. 4.

In accordance with an important feature of the present invention, the internally threaded, centrally disposed vertical post 50 extends upwardly from the block member 42 and includes a plurality of integral flattened, planar surfaces 134 for example in the shape of a hexagonally-shaped nut for attachment of a rotating tool, for example a hexagonal rachet box 138 or socket wrench 139. In accordance with another important feature of the present invention, a removable preferably plastic, handle generally designated 140 includes an elongated internal bore or aperture 142 shaped complementary to the flattened surfaces 134 of the hexagonally-shaped upper portion 136 of the post 50 so that the internal bore 142 in handle 140 includes a plurality of flattened internal surfaces 144 corresponding in shape and dimension to the flattened external surfaces 134 of the hexagonal nut 136 in post 50. In this manner, the removable handle 140 can be positioned over the upwardly extending post 50 to cause the post 50 to rotate by hand movement of the handle 140 thereby causing the externally threaded shaft 68 to move upwardly or downwardly within the post 50 to position the foot members 82 and 84 of the coil spring compression member 72 onto the upper surface 90 of the valve spring retainer assembly 92 so that further rotation of the handle 140 and post 50 in a direction to cause the externally threaded shaft 68 to move downwardly while the claw members 34 and 36 are disposed on an undersurface of the coil spring 16, as shown in FIGS. 2 and 4, will cause compression of the coil spring 16 and valve retainer assembly 92, as best shown in FIG. 4, thereby lowering the valve retainer assembly 92 so that an innermost surface 145 of the valve retainer assembly 92 no longer is in contact with an outer complementary-shaped surface 146 of valve keeper halves 148 and 150. These valve keeper halves 148 and 150 must be removed in this manner from the valve stem 20 before the valve retainer assembly 92 can be slipped over the top of the valve stem 20 for removal and replacement of the rubber seal 18 or any other desired maintenance operation performed on the valves 12 of the internal combustion engine 14, as shown in FIG. 6.

Figure 8:
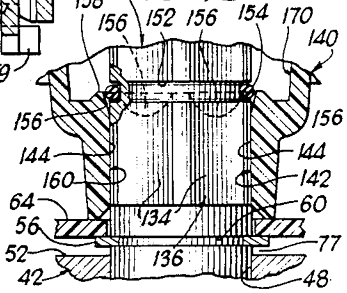
FIG. 8 is a partially broken away, cross-sectional view of a post and handle portion of the present invention taken along the line 8—8 of FIG. 7.

In accordance with another important feature of the present invention, the upwardly extending post 50 includes an annular groove 152 carrying an elastomeric O-ring 154 extending outwardly from all of the flattened surfaces 134 in the upwardly extending portion of the internally threaded post 50, as best shown in FIG. 8. When the removable handle 140 is disposed in position surrounding the flattened surfaces 134 of the upwardly extending post portion 50, as best shown in FIG. 8, the elastomeric O-ring 154 is disposed in contact against a downwardly and inwardly tapered portions 156 machined in each of the flattened surfaces 144 of handle 140 at an upper end 158 of a smaller internal diameter portion 160 of the internal bore 142 of handle 140 so that the handle 140 can be securely positioned onto the post 50 and removed therefrom without damage to the elastomeric O-ring 154. It has been found to achieve the full advantage of the present invention that the upper end 158 of the smaller diameter bore 160 within the handle 140 should be tapered in this manner in order to securely hold the handle 140 in position around the post 50 without damage to the elastomeric O-ring 154.

In accordance with a preferred embodiment, the handle 140 includes a plurality of radially extending integral ear members 162 and a removable cover member 164 capable of snapping into secured engagement within an annular groove 166 in an upper end 168 of a wider diameter internal bore portion 170 within the handle 140. Removal of the removable cover portion 164 enables the mechanic to secure a wrench over the flattened surfaces 134 on the upper portion of the post 50 for more easily turning the post 50 in securing the tool 10 to the coil spring 16 in situations where it is more difficult to turn the post 50 requiring a wrench or other rotating tool. Alternatively, the handle 140 can be removed for location of a wrench or other rotating device about the flattened external surfaces 134 on post 50 for compressing the coil spring 16.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A valve spring compressing tool including a pair of gripping leg members operatively connected to straddle a valve spring, on opposed sides thereof, said leg members each including a gripping means disposed on a lower portion thereof for gripping an undersurface of a coil spring; compression means for compressing the coil spring on opposite sides thereof at points above the gripping means, said compression means operatively interconnected on an elongated post such that rotation of the post in opposite directions will cause the compression means to move toward and away from the gripping means to compress the coil spring or allow the coil spring to expand, said elongated post including a plurality of planar surfaces on an upper portion thereof adapted to receive a removable handle; a removable handle having an internal bore adapted to be securely and removably connected to an upper portion of the elongated post, said elongated post including an elastomeric O-ring held within an annular groove disposed within the planar surfaces of the elongated post for removably securing the handle thereto.

2. The apparatus of claim 1 wherein the post includes an internally threaded bore operatively connected an externally threaded shaft operatively threaded within the post such that rotation of the post causes the externally threaded shaft to move longitudinally upwardly and downwardly within the post, and wherein the compression member is operatively connected to the externally threaded shaft so that post rotation causes longitudinal movement of the compression member.

3. The apparatus of claim 2 wherein the post is rotatably secured to a post-receiving member through an aperture extending completely through the post-receiving member.

4. The apparatus of claim 3 wherein the leg members are pivotally secured to the post-receiving member and spring biased to pivot about the post-receiving member to dispose the compression means radially inwardly toward a longitudinal axis of the post and externally threaded shaft.

5. The apparatus of claim 3 further including an annular collar secured to a lower portion of the post to prevent inadvertent removal of the post from the post-receiving member, and an upper retaining means secured to the post at a point above the post-receiving member for retaining the post within the post-receiving member.

6. The apparatus of claim 5 wherein the upper retaining means is secured to, and extends outwardly from the post at a point above an uppermost surface of the post-receiving member and is spaced upwardly from the uppermost surface of the post-receiving member such that by impacting an uppermost surface of the post, the post moves downwardly a distance equal to the dimension of the space, causing vertical downward movement of the externally threaded shaft and the compression means until the upper retaining means contacts the uppermost surface of the post-receiving member thereby causing impact of the compression means against a valve spring retaining member to initially loosen the valve spring retaining member to enable spring compression by rotation of the post.

7. The apparatus of claim 5 wherein the annular collar includes an upwardly and inwardly tapered internal annular side wall adapted to compress a C-shaped lower retaining clip into a groove in an outer surface of the externally threaded shaft.

8. The apparatus of claim 7 wherein the annular collar and retaining clip are tightly secured to a lower end of the post, and the upper retaining means is tightly secured to the post above the post-receiving member such that the post, the collar, and the lower retaining clip rotate in unison within the aperture in the post-receiving member without rotation of the post-receiving member.

9. The apparatus of claim 1 wherein each leg member includes an integral, outwardly extending ear member disposed on an upper portion thereof adapted to be squeezed by hand to cause separation of the gripping means on the leg members such that the gripping means can be initially manually disposed to contact an undersurface of a coil spring on opposed sides thereof.

10. The apparatus of claim 6 wherein the space between the upper retaining means and the post-receiving member is in the range of about 1/64 inch and ¼ inch.

11. The apparatus of claim 10 wherein the space is about 1/32 of an inch.

12. A valve spring compression kit comprising three gripping leg members operatively connectable to straddle a valve spring, on opposed sides thereof, said leg members each including a gripping means disposed on a lower portion thereof for gripping an undersurface of a coil spring; compression means for compressing the coil spring on opposite sides thereof at points above the gripping means, said compression means operatively interconnected to an elongated post such that rotation of the post in opposite directions will cause the compression means to move toward and away from the gripping means to compress the coil spring or allow the coil spring to expand, said elongated post including a plurality of planar surfaces on an upper portion thereof adapted to receive a removable handle; a removable handle having an internal bore adapted to be securely and removably connected to an upper portion of the elongated post, said elongated post including securing means extending outwardly from the planar surfaces thereof for removably securing the handle thereto wherein at least one of the leg members is removably attachable and replaceable with one of the other leg members, at least two of the leg members being of different length.

13. A valve spring compressing tool including a pair of gripping leg members operatively connected to straddle a valve spring, on opposed sides thereof, said leg members of each including a gripping means disposed on a lower portion thereof for gripping an undersurface of a coil spring; compression means for compressing the coil spring on opposite sides thereof at points above the gripping means, said compression means operatively interconnected to an elongated post such that rotation of the post in opposite directions will cause the compression means to move toward and away form the gripping means to compress the coil spring or allow the coil spring to expand, said elongated post rotatably secured to a post-receiving member through an aperture extending completely through the post-receiving member, and including a plurality of planar surfaces on an upper portion of the post adapted to receive a removable handle; a removable handle having an internal bore adapted to be securely and removably connected to an upper portion of the elongated post, said elongated post including securing means extending outwardly from the planar surfaces thereof for removably securing the handle thereto.

14. The apparatus of claim 13 wherein the leg members are pivotally secured to the post-receiving member and spring biased to pivot about the post-receiving member to dispose the compression means radially inwardly toward a longitudinal axis of the post and externally threaded shaft.

15. The apparatus of claim 13 further including an annular collar secured to a lower portion of the post to prevent inadvertent removal of the post from the post-receiving member, and an upper retaining means secured to the post at a point above the post-receiving member for retaining the post within the post-receiving member.

16. A valve spring compressing tool including a pair of gripping leg members operatively connected to straddle a value spring, on opposed sides thereof, said leg members each including a gripping means disposed on a lower portion thereof for gripping an undersurface of a coil spring; compression means for compressing the coil spring on opposite sides thereof at points above the gripping means, said compression means operatively interconnected to an elongated post such that rotation of the post in opposite directions will cause the compression means to move toward and away form the gripping means to compress the coil spring or allow the coil spring to expand, said elongated post rotatably secured to a post-receiving member through an aperture extending completely through the post-receiving member, and including a plurality of planar surfaces on an upper portion thereof adapted to receive a removable handle; an upper retaining means secured to an extending outwardly from the post at a point above an uppermost surface of the post-receiving member and spaced upwardly from the uppermost surface of the post-receiving member such that by impacting an uppermost surface of the post, the post moves downwardly a distance equal to the dimension of the space, causing vertical downward movement of the externally threaded shaft and the compression means until the upper retaining means contacts the uppermost surface of the post-receiving member thereby causing impact of the compression means against a valve spring retaining member to initially loosen the valve spring retaining member to enable spring compression by rotation of the post; a removable handle having an internal bore adapted to be securely and removably connected to an upper portion of the elongated post, said elongated post including securing means extending outwardly from the planar surfaces thereof for removably securing the handle thereto.

17. The apparatus of claim 16 wherein the annular collar includes an upwardly and inwardly tapered internal annular side wall adapted to compress a C-shaped lower retaining clip into a groove in an outer surface of the externally threaded shaft.

18. The apparatus of claim 17 wherein the annular collar and retaining clip are tightly secured to a lower end of the post, and the upper retaining means is tightly secured to the post above the post-receiving member such that the post, the collar, and the lower retaining clip rotate in unison within the aperture in the post-receiving member without rotation of the post-receiving member.

* * * * *